United States Patent
Sharma et al.

(10) Patent No.: US 9,244,917 B1
(45) Date of Patent: Jan. 26, 2016

(54) GENERATING A LAYOUT

(71) Applicant: Google Inc., Mountain View, CA (US)

(72) Inventors: Jayesh Sharma, Sunnyvale, CA (US);
Paul Bankhead, Sunnyvale, CA (US);
Raphael H. Ribas, Mountain View, CA (US)

(73) Assignee: Google Inc., Mountain View, CA (US)

( * ) Notice: Subject to any disclaimer, the term of this patent is extended or adjusted under 35 U.S.C. 154(b) by 462 days.

(21) Appl. No.: 13/629,888

(22) Filed: Sep. 28, 2012

Related U.S. Application Data

(60) Provisional application No. 61/541,542, filed on Sep. 30, 2011.

(51) Int. Cl.
*G06F 17/00* (2006.01)
*G06F 17/30* (2006.01)

(52) U.S. Cl.
CPC .............................. *G06F 17/30011* (2013.01)

(58) Field of Classification Search
CPC ............................................. G06F 17/30011
USPC ................. 715/204, 212, 222, 235, 243, 246
See application file for complete search history.

(56) References Cited

U.S. PATENT DOCUMENTS

2005/0055635 A1* 3/2005 Bargeron et al. ............. 715/525
2013/0024757 A1* 1/2013 Doll et al. .................... 715/204

OTHER PUBLICATIONS

Example pages from website Shoplocal.com, including "Circular Central", [online] Retrieved from the Internet [retrieved on Feb. 5, 2013] at URL:<http://www.shoplocal.com/?citystatezip=02108&newzone=y>, (2013).
DeSandro, David, "A dynamic layout plugin for jQuery—The flip side of CSS floats", pages from website "jQuery Masonry", [online] Retrieved from the Internet [retrieved on Feb. 5, 2013] at URL:<http://masonry.desandro.com>.

\* cited by examiner

*Primary Examiner* — Stephen Hong
*Assistant Examiner* — Gregory J Vaughn
(74) *Attorney, Agent, or Firm* — Foley & Lardner LLP; John D. Lanza

(57) ABSTRACT

Techniques for generating layout may include: receiving data corresponding to images modules; determining that a set of the image modules will fit a layout; assigning image modules from the set to the layout; determining a number of possible permutations of the image modules given one or more constraints associated with images in the set of image modules; selecting a number of candidate templates to accommodate the layout, where the number of candidate templates is based on the number of permutations; filling candidate templates with image modules from the set; receiving an input selecting one of the candidate templates containing image modules from the set; and outputting data for the selected candidate template, the data for generating a display of the selected candidate template.

24 Claims, 15 Drawing Sheets

FIG. 9

GENERATING A LAYOUT

CROSS-REFERENCE TO RELATED APPLICATION

Priority is hereby claimed to U.S. Provisional Application No. 61/541,542, which was filed on Sep. 30, 2011. The contents of U.S. Provisional Application No. 61/541,542 are hereby incorporated by reference into this disclosure.

BACKGROUND

This disclosure relates to generating a layout, e.g., for advertisements.

The Internet provides access to a wide variety of resources. For example, Web pages containing video, audio, news articles, and other content are accessible over the Internet. Content, such as advertising, may also be provided over the Internet, either alone or in combination with provided resources. An example of such content may be an electronic circular. An example electronic circular includes images displayed in one or more Web pages to satisfy some criteria. The images may be advertisements, as noted above, or other appropriate images, such as personal photographs, which may be organized so that they are visually appealing. An electronic circular may be displayed, e.g., on dedicated Web page(s) or in slots of a Web page containing other content. In some examples, Web pages may contain links to other Web page containing electronic circular(s).

SUMMARY

Techniques for generating a layout may include: receiving data corresponding to images modules; determining that a set of the image modules will fit a layout; assigning image modules from the set to the layout; determining a number of possible permutations of the image modules given one or more constraints associated with images in the set of image modules; selecting a number of candidate templates to accommodate the layout, where the number of candidate templates is based on the number of permutations; filling candidate templates with image modules from the set; receiving an input selecting one of the candidate templates containing image modules from the set; and outputting data for the selected candidate template, where the data is for generating a display of the selected candidate template.

Each of the image modules may include an image. One or more of the images modules may include at least one of an information bar and padding. The information bar may be for displaying information relating a corresponding image. The padding may include pixels adjacent to a corresponding image and apart from the corresponding image.

Each of the candidate templates may include slots to accommodate image modules. Filling the candidate templates may include placing image modules in slots of the candidate templates. The foregoing techniques may also include associating annotations with the layout that assign image module attributes to structural features of the candidate templates. The candidate templates may be filled based on the annotations. The image module attributes may include shapes of the image modules, and the structural features of the candidate templates may include a number of columns or rows in a template.

The one or more constraints may correspond to sizes of the image modules. The sizes may fall into two categories. A first of the categories may be for a first set of image modules that are larger than a second set of image modules in the second category. The number of possible permutations may be determined based on an overall number of the image modules and a number of image modules in the first category.

Determining that a set of the image modules will fit a layout may include determining a number of image modules that can be included in a layout; and selecting the set of image modules from among the received image modules, where the set of image modules may be a number of image modules that can be included in the layout. Filling candidate templates with image modules from the set may include identifying a largest image module among the image modules, and identifying a template having a smallest slot that can accommodate the largest image module.

Two or more of the features described in this disclosure, or portions thereof, including this summary section, may be combined to form embodiments not specifically described herein.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

FIG. 9 shows examples of annotated layouts.

Like reference symbols in the various drawings indicate like elements.

DETAILED DESCRIPTION

Described herein is a system for generating a layout of image modules. The images modules may include an image, along with other content, e.g., one or more information bars containing text relating to the image and extra pixels used to pad the image (referred to as "padding"). The image modules may be, e.g., online advertisements, and the layout that is generated from the image modules may form an electronic circular. The electronic circular may be distributed, e.g., on a Web page containing other content or as part of an electronic mailing.

In this regard, the following describes systems for generating layouts of advertisements for electronic circulars. However, the systems described herein have applicability outside the context of advertisements and electronic circulars. For example, the systems may be applied to arrange other types of images (e.g., personal photographs) for purposes other than advertising.

Figure 1:
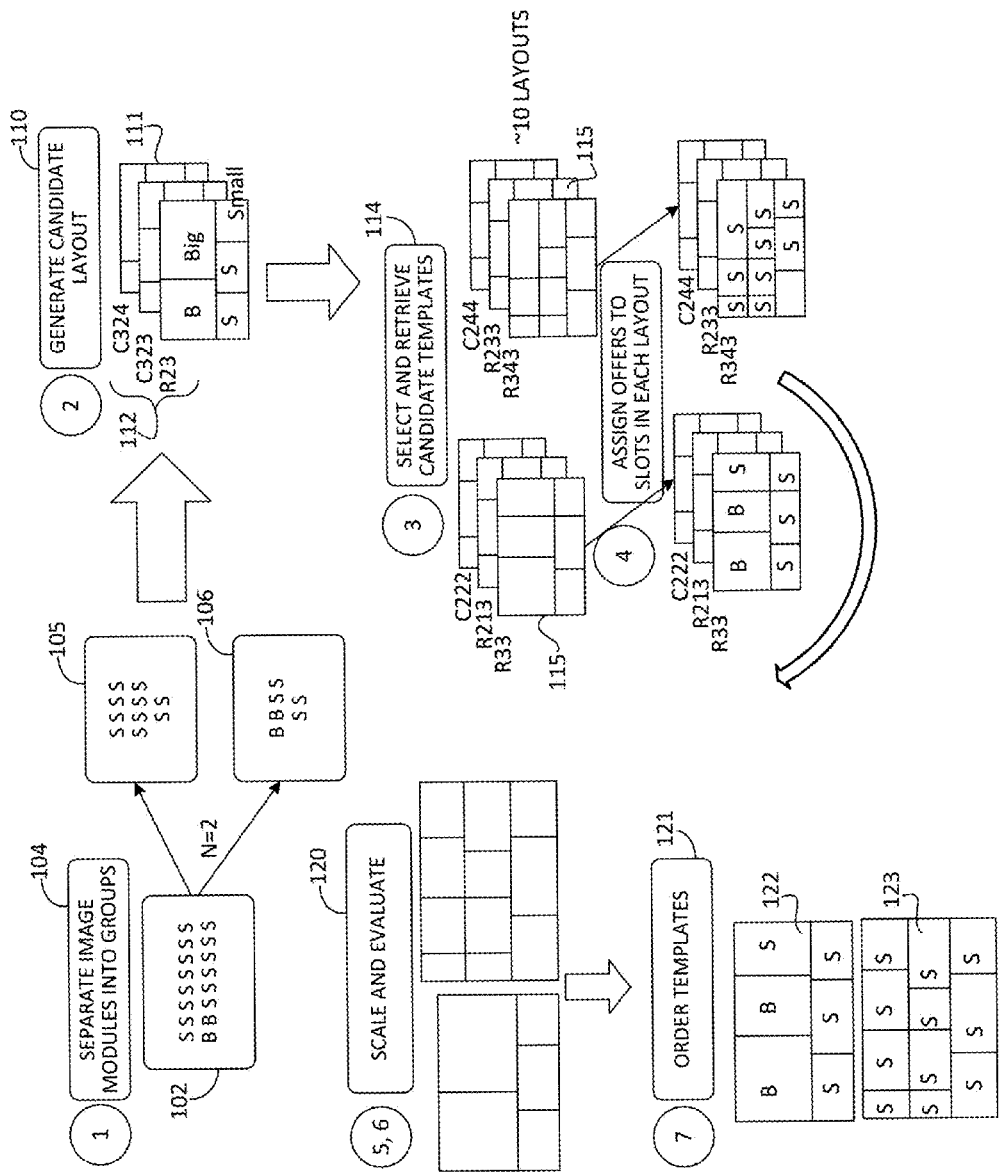
FIG. 1 shows, conceptually, an example system for generating a layout.

FIG. 1 shows, conceptually, an example system 100 for generating layout of advertisements for an online circular. System 100 begins with a group of image modules 102. The images modules may include, e.g., advertisements from various content providers (e.g., advertisers). System 100 uses these image modules to create an electronic circular (which may include content, such as photographs, advertisements, or the like), which may be distributed to a general audience or targeted to specific users of, e.g., a search or other online services.

In FIG. 1, system 100 determines whether the number of image modules 102 will fit within a single layout, e.g., within a single page of an online circular. If so, then processing continues. If not, system 100 separates (104) the image modules into N (N≥1) groups, and assigns each group to a different layout. For example, if there are twenty image modules, and a layout is predefined to accommodate ten image modules, the twenty images modules may be separate into two groups, each including ten image modules and assigned to different layouts. The assignment process may take attributes of the image modules into account.

More specifically, the image modules may be categorized, prior to system processing, as being either a first type or a second type. In an example, the first type of image modules are "big" (B) image modules and the second type of image modules are "small" (S) image modules. In this example, "big" refers to image modules having more than a predefined size (e.g., more than a predefined area), and "small" refers to image modules having less than the predefined size (e.g., less than the predefined area). Metadata may be associated with each image module to identify each image module as a big image module or a small image module. In other examples, sizes may be determined at processing time, e.g., by counting numbers of pixels in the horizontal and vertical directions.

In the example of FIG. 1, there are two templates shown. System 100 assigns the layouts taking into account whether image modules are designated as big or small. In an example, the sizes of the image modules may influence the number of image modules that can be included in a template. By way of example, a template may correspond to a single Web page. Such a Web page may have a finite size. Given this constraint, the Web page may be limited to displaying a certain number of small image modules, a certain number of big image modules, or some combination thereof. For example, as shown in FIG. 1, template 105 can include ten small image modules (designated as "S") and template 106 can include two big image modules (designated as "B") and four small image modules.

Up to this point, even though image modules have been assigned to templates, the actual layouts for those templates have not been generated. The system therefore generates (110) candidate layouts 111 for the assigned image modules. The layouts are designated as "candidate" because none of the candidate layouts have, as of yet, been selected by the system to be a final layout. In an example, to generate the candidate layouts, the system determines the number of possible permutations for the image modules given the input constraints including, e.g., whether the image modules have been designated as big or small.

Figure 2:
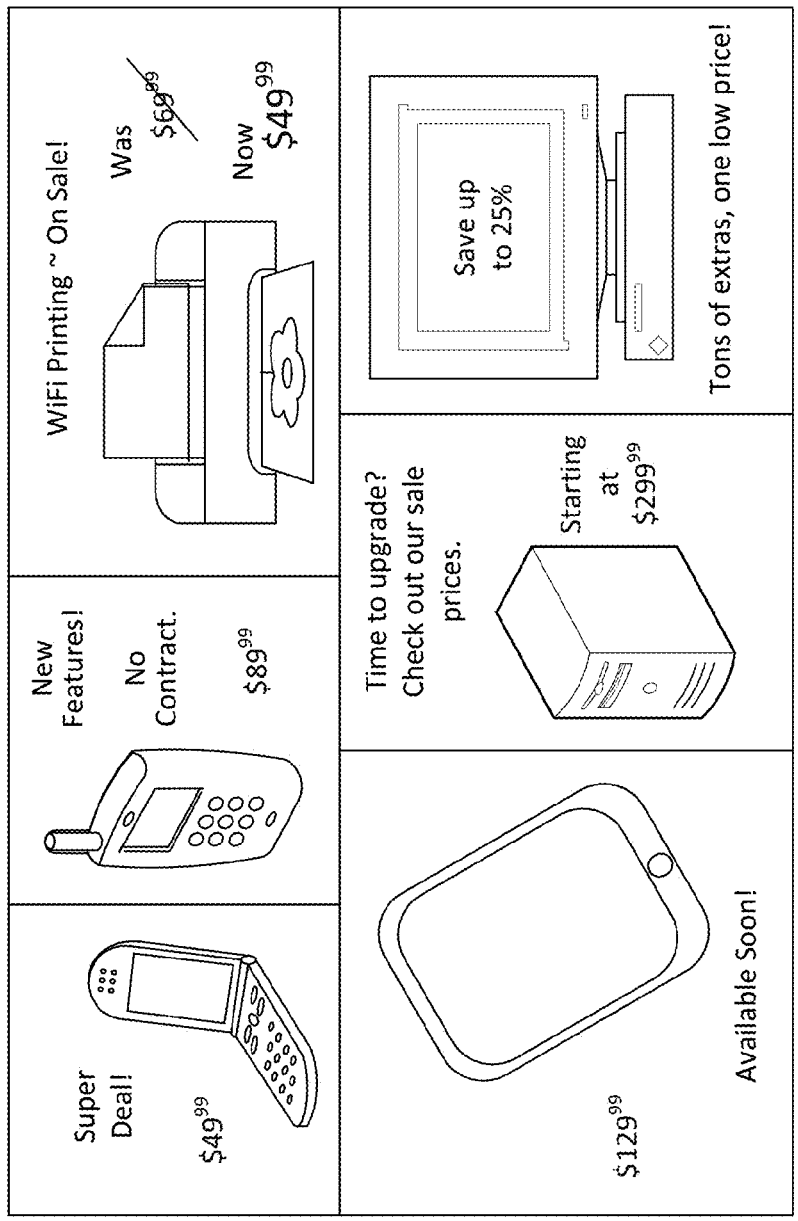
FIG. 2 shows an example layout having a row format.
Figure 3:
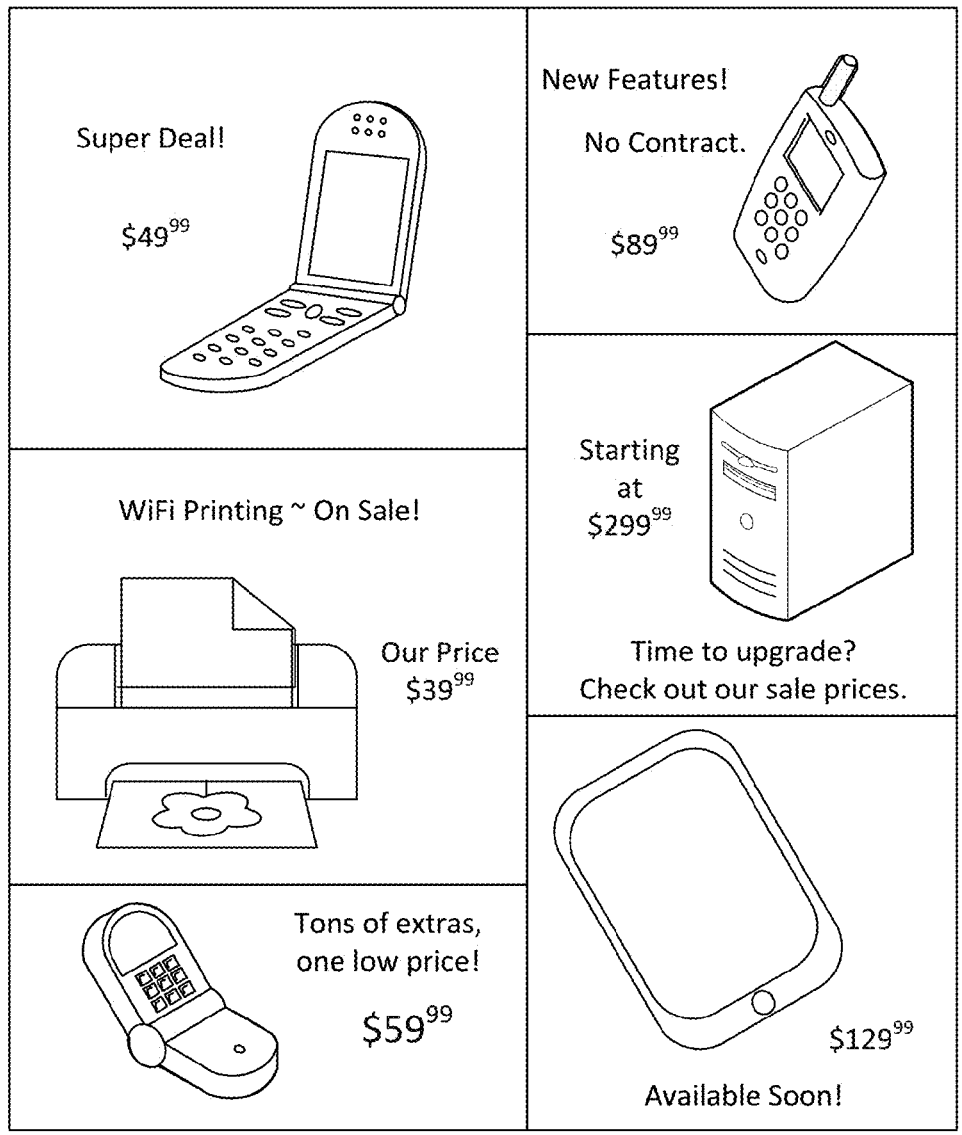
FIG. 3 shows an example layout having a column format.

More specifically, along with the image modules, the system may receive information about a desired structure of a layout. For example, the system may receive information indicating that the layout is to be in grid form. The information may also indicate that the layout is to be row-type, in which image modules are arranged by row (see. e.g., FIG. 2); column-type, in which image modules are arranged by column (see, e.g., FIG. 3); or either column-type or row-type (e.g., the system decides whether to present the image modules in columns rows). The system may also receive information indicating a range of image modules per row (e.g., one to three) and/or a range of image modules per column (e.g., two to five). The system may select, based on this information, based on the total number of image modules, and based on the number of big and/or small image modules received, the possible layouts for the image modules. This may be done, e.g., by reference to a predefined look-up table, as described below.

Figure 4:
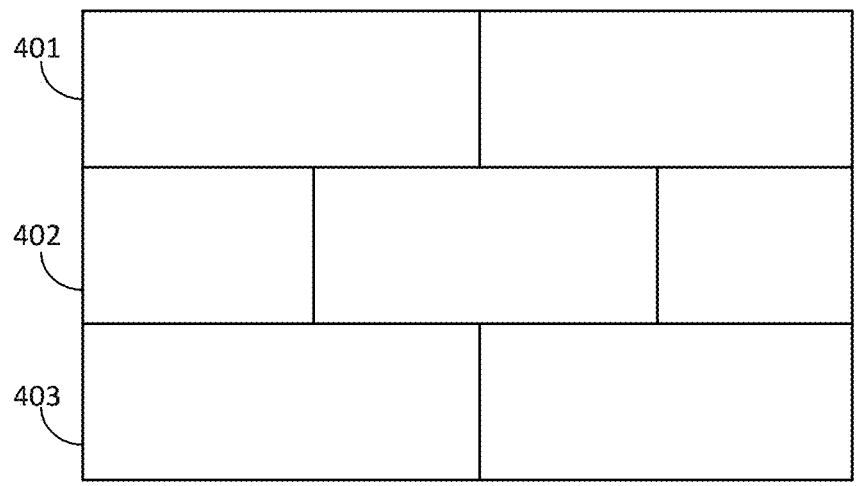
FIGS. 4 and 5 show examples of templates.

The candidate layouts may indicate, e.g., a layout type (e.g., row or column), a number of slots per row, and a number of slots per column. In this context, a "slot" is an area of a layout template to which image modules may be assigned. For example, FIG. 4 shows two slots in row 401, three slots in row 402, and two slots in row 402. Templates may have a fixed width or height; however, slot size may vary from template-to-template. So, for example, a slot size configured to accommodate a big image module may be 100 pixels in width in a first template, a slot size configured to accommodate a big image module may be 75 pixels in width in a second template, and so forth. In some implementations, slot size between templates need not be variable in this manner.

As shown in FIG. 1, the layouts may be designated using shorthand 112. This shorthand indicates a row-type or column-type layout by "R" or "C", respectively, followed by a number of slots in each successive row or column. So, for example, a designation of R2332 indicates that the layout is row-type (R) having four rows (since there are four numbers following R), where the first row contains two (2) slots, the second row contains (3) slots, the third row contains three (3) slots, and the fourth row contains (2) slots. In another example, a designation of C33 indicates that the layout is column-type (C) having two rows (since there are two numbers following C), where the first column has three slots and the second column has three slots. Other types of designations may be used in lieu of these.

Figure 5:
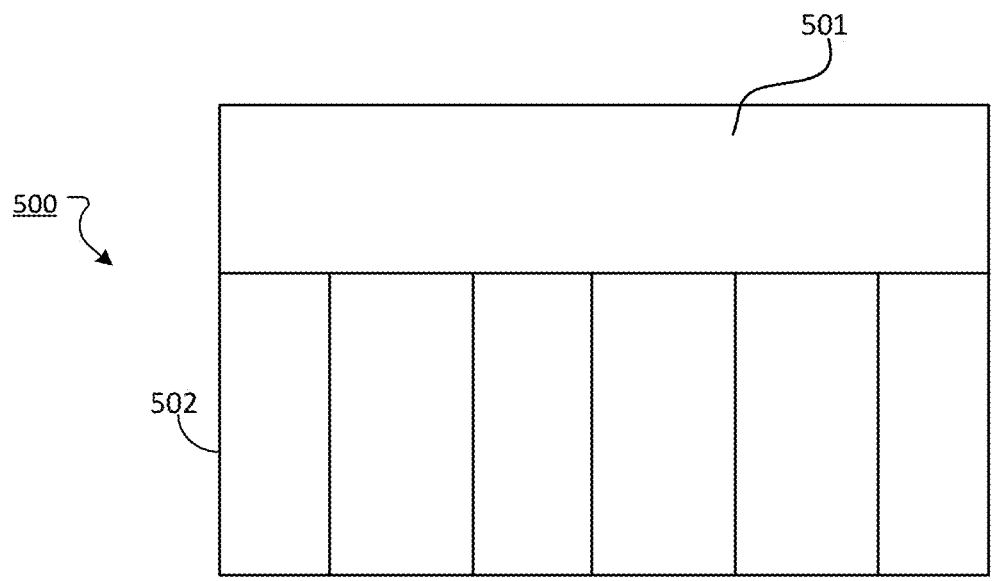

System 100 also annotates the layouts. For example, for a given number of slots per row or slots per column, the system may specify the natural aspect ratio (e.g., the ratio of width to height) of an image module. Referring to FIG. 5, for example if a row-type layout 500 is being generated, and, if there is only one slot in a first row 501, the natural aspect ratio for that will be "wide" (e.g., width exceeds height), since the image module should cover the entire row, or at least a good percentage thereof (e.g., >50%). Similarly, for example, if a row-type layout is being generated, and, if there are six slots in a second row 502, the natural aspect ratio for each slot in the second row will be "tall" (e.g., height exceeds width). These annotations may be used in the processes described below for assigning image modules to slots in templates that form the layouts.

The system selects and retrieves (114) candidate templates 115 for the generated layouts. In this example, the candidate templates are selected from a library of predefined templates having structures (e.g., row format, column format, number of rows, number of columns, etc.) that comport with the input constraints, and that correspond to the generated layouts. In this example, the system selects and retrieves at least candidate templates having the same structure as the generated layouts (and, in some implementations, additional templates). So, for example, if the system generated layouts of C324, C323 and R23 for a received set of image modules, the system selects and retrieves, from the template library, at least templates having the C324, C323 and R23 structures.

System 100 assigns image modules (e.g., advertisements) to the retrieved templates. In this example, system 100 may assign image modules to slots in the templates using different processes, details of which are provided below. The result of the assignment processes is a number of different templates having the same image modules contained therein. For example, there may be various versions of the C324, C323 and R23 templates with appropriate image modules occupying the various slots. In some cases, the same image modules may occupy the same slots of each template, or those image modules may occupy different slots of the templates. For example, a given image module may be placed in a first slot in a first row of one template or it could be placed in a second slot of a second row of the same template, and so forth.

System 100 may scale (120) one or more of the candidate templates. For example, through scaling, the image module may be increased or decreased in size. Increases or decreases in size may include changes to image height and/or width. In some examples, the aspect ratio of the image is preserved when the image is scaled, although this need not be the case.

The resulting candidates for each template are displayed, e.g., on a computer display screen. A final template is selected from the candidates based, e.g., on an evaluation of the visual quality of the template. The evaluation process may machine-implemented and based on objective or measurable factors; the evaluation process may be manual and based on subjective factors; or a combination of machine-implemented and manual.

If there is more than one final template in a layout, those templates are ordered (121). For example, a rank score may be assigned to each template. The rank score may be a sum of scores associated with image modules in a template. The scores may be predefined, e.g., by a content provider such as an advertiser, and stored in metadata associated with the corresponding modules. Alternatively, scores may be assigned to big and small modules in the templates, e.g., with a higher score being assigned to big image modules than to small image modules. The templates may be ranked by score. Alternatively, the templates may be displayed and ordered manually.

The process described with respect to FIG. 1 may be implemented in an appropriate network environment, with appropriate devices and computing equipment. An example of such an environment is described below.

Figure 6:
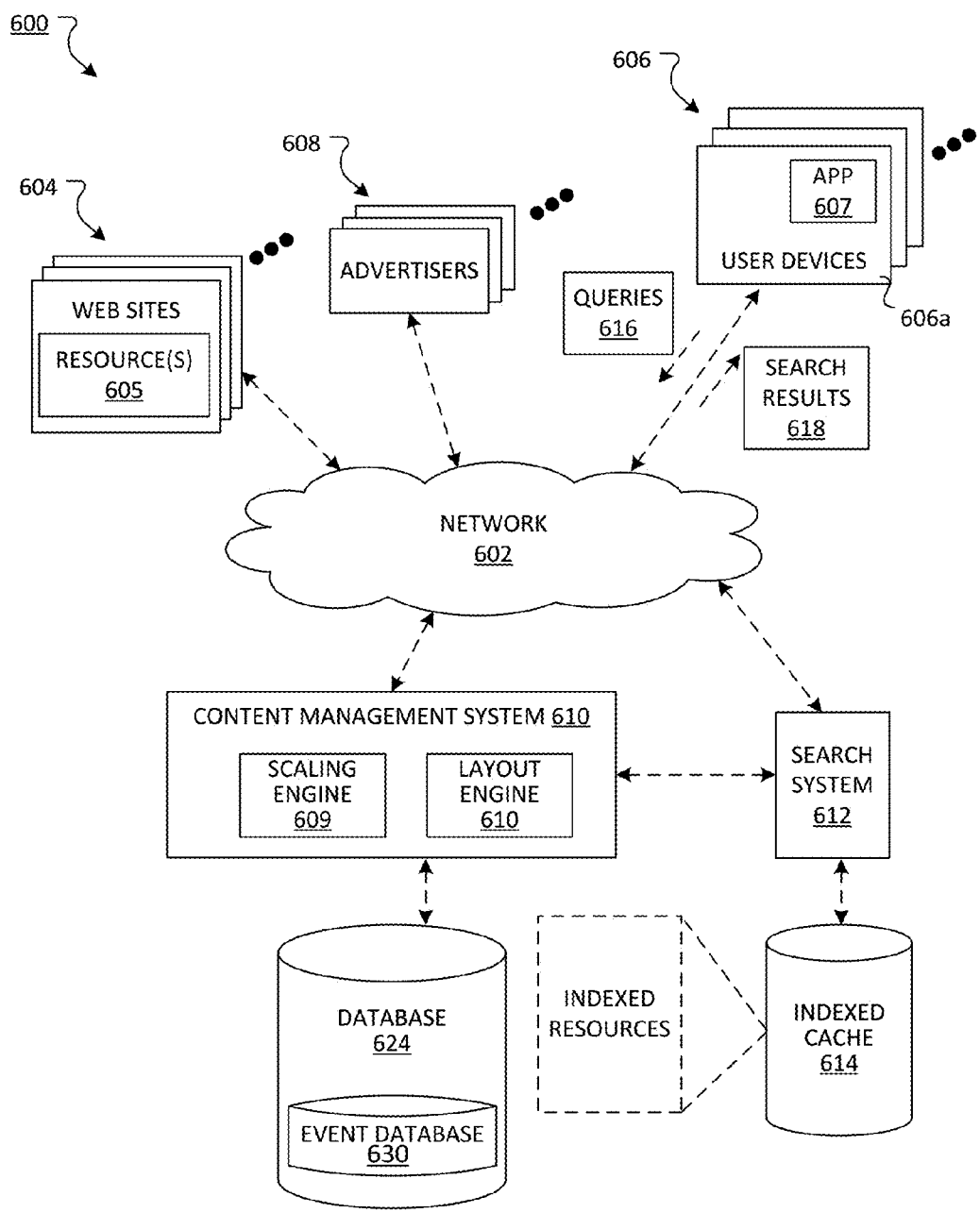
FIG. 6 is a block diagram of an example environment that includes a network.

FIG. 6 is a block diagram of an example environment 600 that includes a network 602. Network 602 can represent a communications network that can allow devices, e.g., a user device 606a, to communicate with entities on the network through a communication interface (not shown), which may include digital signal processing circuitry. Network 602 can include one or more networks. The network(s) may provide for communications under various modes or protocols, e.g., Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. For example, the communication may occur through a radio-frequency transceiver. In addition, short-range communication may occur, e.g., using a Bluetooth, WiFi, or other such transceiver.

Network 602 connects various entities, e.g., Web sites 604, user devices 606, content providers (e.g., advertisers 608), publishers, and a content management system 610. In this regard, example environment 600 may include many thousands of Web sites 604, user devices 606, and content providers (e.g., advertisers 608). Entities connected to network 602 include and/or connect through one or more servers. Each such server may be one or more of various forms of servers, e.g., a Web server, an application server, a proxy server, a network server, or a server farm. Each server can include one or more processing devices, memory, and a storage system.

In FIG. 6, Web sites 604 may include one or more resources 605 associated with a domain name and hosted by one or more servers. An example Web site 604a is a collection of Web pages formatted in hypertext markup language (HTML) that can contain text, images, multimedia content, and programming elements, e.g., scripts. Each Web site 604 can be maintained by a content publisher, which is an entity that controls, manages and/or owns the Web site 604.

A resource 605 may be appropriate data that can be provided over network 602. A resource 605 can be identified by a resource address that is associated with the resource 605. Resources 605 can include HTML pages, word processing documents, portable document format (PDF) documents, images, video, and news feed sources, to name only a few. Resources 605 can include content, e.g., words, phrases, images and sounds, that may include embedded information (e.g., meta-information hyperlinks) and/or embedded instructions (e.g., JavaScript scripts).

To facilitate searching of resources 605, environment 600 can include a search system 612 that identifies the resources 605 by crawling and indexing the resources 605 provided by the content publishers on the Web sites 604. Data about the resources 605 can be indexed based on the resource 605 to which the data corresponds. The indexed and, optionally, cached copies of the resources 605 can be stored in an indexed cache 614.

An example user device 606a is an electronic device that is under control of a user and that is capable of requesting and receiving resources over the network 602. A user device may include one or more processing devices, and may be, or include, a mobile telephone (e.g., a smartphone), a laptop computer, a handheld computer, a tablet computer, a network appliance, a camera, an enhanced general packet radio service (EGPRS) mobile phone, a media player, a navigation device, an email device, a game console, or a combination of two or more of these data processing devices or other data processing devices. In some implementations, the user device can be included as part of a motor vehicle (e.g., an automobile, an emergency vehicle (e.g., fire truck, ambulance), a bus).

User device 606a typically stores one or more user applications, e.g., a Web browser, to facilitate the sending and receiving of data over the network 602. User device 606a can request resources 605 from a Web site 604a. In turn, data representing the resource 605 can be provided to the user device 606a for presentation by the user device 606a. User devices 606 can also submit search queries 616 to the search system 612 over the network 602. A request for a resource 605 or a search query 616 sent from a user device 606 can include an identifier, e.g., a cookie, identifying the user of the user device.

In response to a search query 616, the search system 612 can access the indexed cache 614 to identify resources 605 that are relevant to the search query 616. The search system 612 identifies the resources 605 in the form of search results 618 and returns the search results 618 to a user device 606 in search results pages. A search result 618 may be data generated by the search system 612 that identifies a resource 605 that is responsive to a particular search query 616, and includes a link to the resource 605. An example search result 618 can include a Web page title, a snippet of text or a portion of an image extracted from the Web page, and the URL (Unified Resource Location) of the Web page.

Content management system 610 may be used for selecting, generating, and providing content in response to requests for content. For example, a scaling engine 609 and a layout engine 610, which may be part of content management system 610, may perform operations to generate electronic circulars, including those described herein.

Content management system 610 also can update database 624 based on activity of a user. In this regard, the database 624 can store a profile for the user which includes, for example, information about past user activities, e.g., visits to a place or event, past requests for resources 605, past search queries 616, other requests for content, Web sites visited, or interactions with content. In some implementations, the information in database 624 can be derived, for example, from one or more of a query log, an advertisement log, or requests for content. The database 624 can include, for each entry, a cookie identifying the user, a timestamp, an IP (Internet Protocol) address associated with a requesting user device 606, a type of usage, and details associated with the usage.

In this example, the content management system 610 can evaluate information in database 624 to determine whether to target content, such as advertising, to a user, e.g., to determine whether to send the user an electronic circular of the type generated by the processes described herein. The targeting information may take into account numerous factors including, but not limited to, historical search activities of the user including, e.g., search keywords used, particular content interacted with, sites visited by the user, etc.

When a resource 605 or search results 618 are requested by a user device 606, content management system 610 can receive a request for content to be provided with the resource 605 or search results 618. The request for content can include characteristics of one or more "slots" that are defined for the requested resource 605 or search results page. For example, the data representing the resource 605 can include data specifying a portion of the resource 605 or a portion of a user display, e.g., a presentation location of a pop-up window or a slot of a third-party content site or Web page, in which content can be presented. An example slot is an ad slot. Search results pages can also include one or more slots in which other content items (e.g., ads) can be presented.

In an example, an ad slot may be filled with an image link to an electronic circular generated according to the processes described herein. In other examples, electronic circulars may be sent to a user through other channels, e.g., the electronic circulars may be sent by e-mail or through social media.

Information about slots can be provided to content management system 610. For example, a reference (e.g., URL) to the resource for which the slot is defined, a size of the slot, and/or media types that are available for presentation in the slot can be provided to the content management system 610.

Similarly, keywords associated with a requested resource ("resource keywords") or a search query 616 for which search results are requested can also be provided to the content management system 610 to facilitate identification of content that is relevant to the resource or search query 616.

Based at least in part on data included in the request, the content management system 610 can select content that is eligible to be provided in response to the request ("eligible content items"). For example, eligible content items can be eligible ads having characteristics matching the characteristics of ad slots and that are identified as relevant to user interests, e.g., an electronic circular. In some implementations, the universe of eligible content items (e.g., ads) can be narrowed by taking into account other factors, e.g., specified resource keywords or previous search queries 616. For example, content items corresponding to historical search activities of the user including, e.g., search keywords used, particular content interacted with, sites visited by the user, etc. may also be used in the selection of eligible content items by the content management system 610.

Content management system 610 can select the eligible content items that are to be provided for presentation in slots of a resource 605 or search results page 618 based, at least in part, on results of an auction. For example, for eligible content items, content management system 610 can receive bids from content providers (e.g., advertisers 608) and allocate slots, based at least in part on the received bids (e.g., based on the highest bidders at the conclusion of the auction). The bids are amounts that the content providers are willing to pay for presentation (or selection) of their content with a resource 605 or search results page 618. For example, a bid can specify an amount that a content provider is willing to pay for each 600 impressions (i.e., presentations) of the content item, referred to as a CPM bid. Alternatively, the bid can specify an amount that the content provider (e.g., a publisher of an electronic circular) is willing to pay for a selection (i.e., a click-through) of the content item or a conversion following selection of the content item. The selected content item can be determined based on the bids alone, or based on the bids of each bidder being multiplied by one or more factors, e.g., quality scores derived from content performance, landing page scores, and/or other factors.

Figure 7:
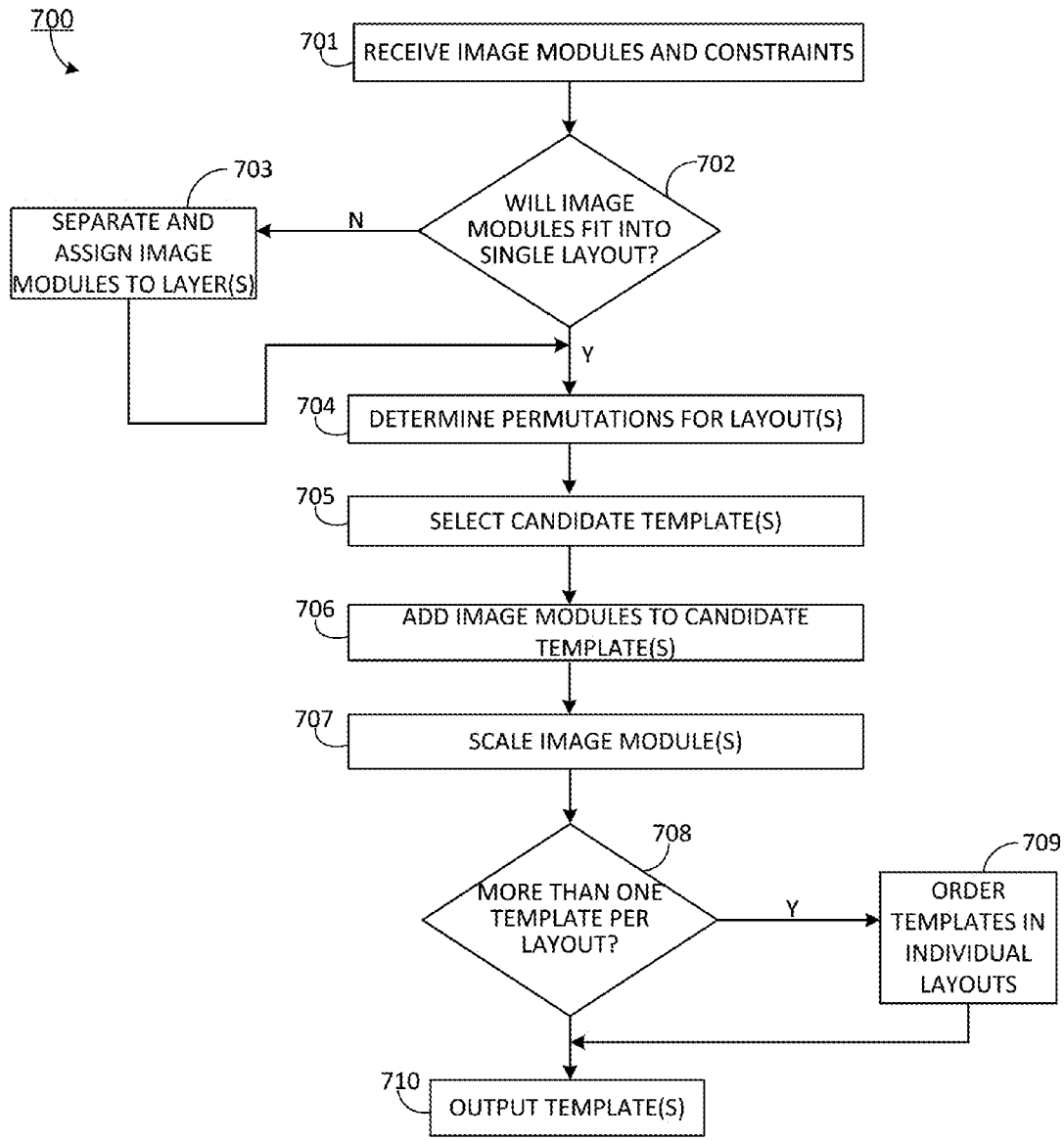
FIG. 7 is a flowchart showing an example process for generating a layout of image modules.

FIG. 7 is a flowchart showing an example process 700 for generating a layout of image modules. Process 700 may be performed, e.g., by scaling engine 609 and layout engine 610 in content management system 600 (FIG. 6).

Process 700 includes receiving (701) image modules and associated constraints. The image modules may include, e.g., advertisements or other materials appropriate for an electronic circular. The image modules may include images and, e.g., one or more information bars and one or more padding areas. The constraints may include, e.g., the type of layout desired (e.g., column-type, row-type, or either column-type or row-type), a desired number of rows or columns per layout, the designation of image modules as big or small, and the number of slots designated per row or column. Constraints also may include other factors, e.g., the size of a view screen on which layouts are to be viewed. Other constraints, which are not specifically mentioned here, may also be received (701).

Figure 8:
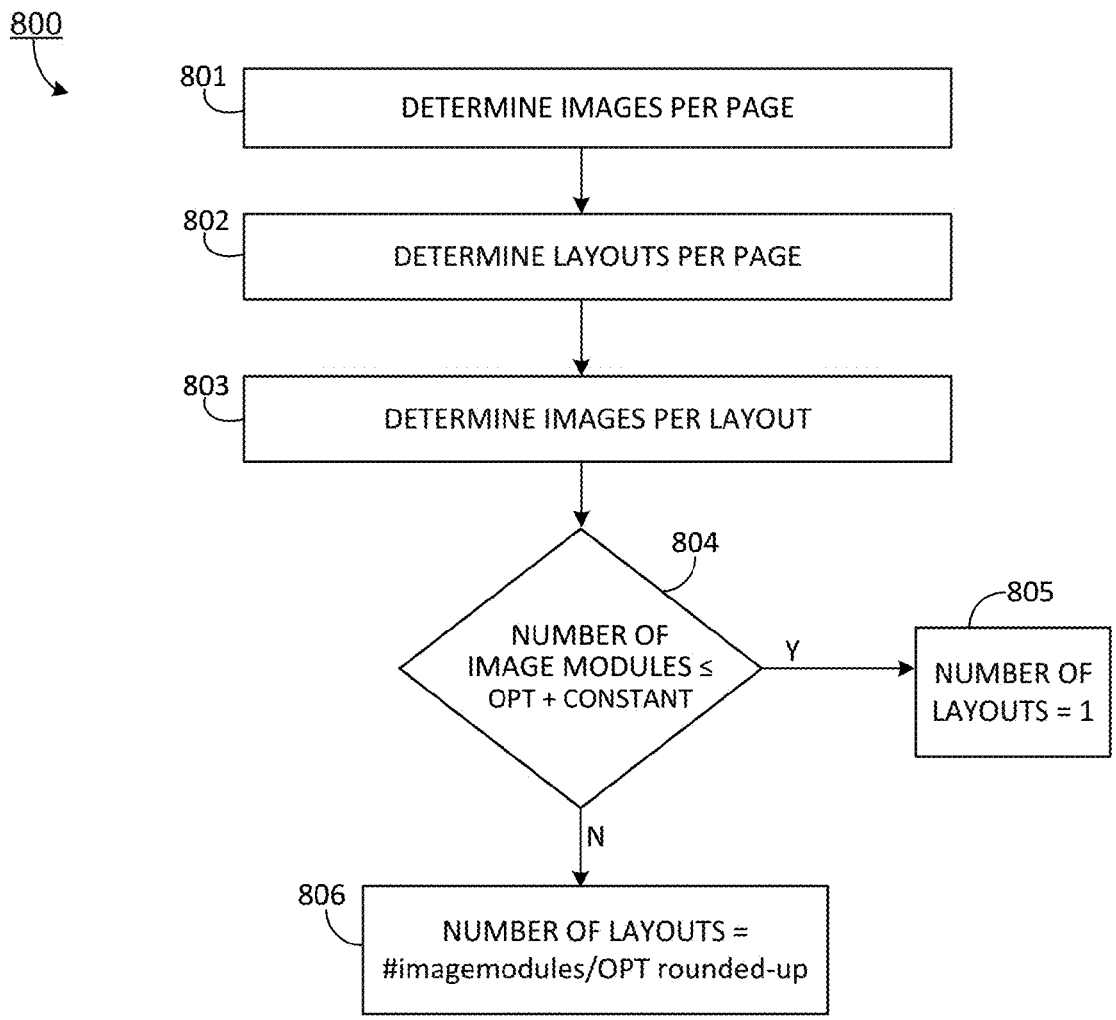
FIG. 8 is a flowchart showing an example process for separating image modules into groups for assignment to templates.

Process 700 determines (702) whether the received image modules will fit into a single layout in view of the associated constraints. If the received image modules will not fit into a single layout, the image modules are separated (703) into groups, and assigned to different layouts. The different layouts may be part of a group of layouts that, together, make-up the electronic circular. For example, the group of layouts may be different Web pages, which can be scrolled-through using a Web browser. By way of example, as explained above, twenty image modules may be received. A layout, however, may be limited (e.g., by an advertiser) to ten image modules. Accordingly, in this example, the images modules may be separate into groups, each including ten image modules. Process 800 of FIG. 8 is an example of how this may be done. Process 800 is described below.

Referring back to FIG. 7, process 700 determines (704) permutations for the image modules (or individual groups of image modules) given the received constraints including, e.g., whether the layout is row-type or column-type, the number of slots per row or column, and the designated number of rows or columns. In this regard, the constraints need not be specific numbers, but rather may be ranges, with the system generating various layouts for each of the ranges. By way of example, the number of rows in a layout may be between one to three rows, and the number of columns may be two to five columns. In this example, there may be one to five slots per row or two to four slots per column. Given that there may be one to three rows, two to five columns, one to five slots per row, or two to four slots per column, the number of possible layouts in this example is 322.

The number of possible layouts, however, can be reduced by taking into account constraints including, e.g., the number of big and small image modules per layout. For example, a table may be generated and stored prior to execution of process 700. This table may specify limitations on the number of possible layouts given the number of big image modules in a set. An example of such a table is Table 1 below.

TABLE 1

| Count Code Total Items | # big items 0 | 2 | 4 | 6 | 8 | Grand Total |
|---|---|---|---|---|---|---|
| 2 |  | 2 |  |  |  | 2 |
| 3 | 2 |  |  |  |  | 2 |
| 4 | 2 |  | 2 |  |  | 4 |
| 5 | 1 | 4 |  | 2 |  | 5 |
| 6 | 2 | 4 | 6 |  |  | 8 |
| 7 | 4 | 2 | 6 |  | 1 | 12 |
| 8 | 4 | 6 | 3 | 4 |  | 17 |
| 9 | 4 | 12 | 6 | 4 | 1 | 23 |
| 10 | 7 | 12 | 12 | 4 |  | 30 |
| 11 | 9 | 10 | 12 | 4 |  | 35 |
| 12 | 9 | 15 | 12 |  |  | 40 |
| 13 | 10 | 16 | 6 |  |  | 38 |
| 14 | 10 | 16 |  |  |  | 32 |
| 15 | 9 | 12 |  |  |  | 21 |
| 16 | 7 | 4 |  |  |  | 11 |
| 17 | 4 |  |  |  |  | 4 |
| 18 | 1 |  |  |  |  | 1 |
| Grand Total | 85 | 115 | 65 | 18 | 2 | 285 |

In Table 1 above, the "Total Items" column corresponds to the number of total items, e.g., the received number of image modules. The "Count of Code" row corresponds to the number of big items (e.g., image modules) present in the count of total items. And the column/row intersections correspond to the number of possible layouts given the appropriate constraints, e.g., that there are one to three rows, two to five columns, one to five slots per row, or two to four slots per column. The right column "Grand Total" indicates the maximum number of layouts for a given number of items (e.g., image modules). Table 1 also has the constraint that there can be one or two big image modules in a single row or column.

By way of example, referring to Table 1 above, if there are six total image modules, then the maximum number of possible layouts given the above constraints is eight. However, if there are "0" big image modules, then the maximum number of layouts is "2"; if there are "2" big image modules, then the maximum number of layouts is "4"; and if there are six big images, then the maximum number of layouts is "2". Process 700 may examine Table 1 in order to reduce the number of possible layouts, which may be processed as described below.

The layouts may also have associated annotations. The annotations may specify, e.g., the natural aspect ratio of image modules that may be included given the input constraints. For example, slots of the layouts may be annotated as wide" (e.g., width exceeds height), "square" (e.g., width and height are equal), or "tall" (e.g., height exceeds width). Table 2, below, shows examples of possible annotations for different numbers of slots per row and rows per column in a layout.

TABLE 2

| Slots per row | natural aspect ratio | slots per column | natural aspect ratio |
|---|---|---|---|
| 1 | wide | 1 | tall |
| 2 | wide | 2 | tall |
| 3 | square | 3 | square |
| 4 | square | 4 | square |
| 5 | tall | 5 | wide |
| 6 | tall | 6 | wide |
| 7 | tall | 7 | wide |

Figure 9:
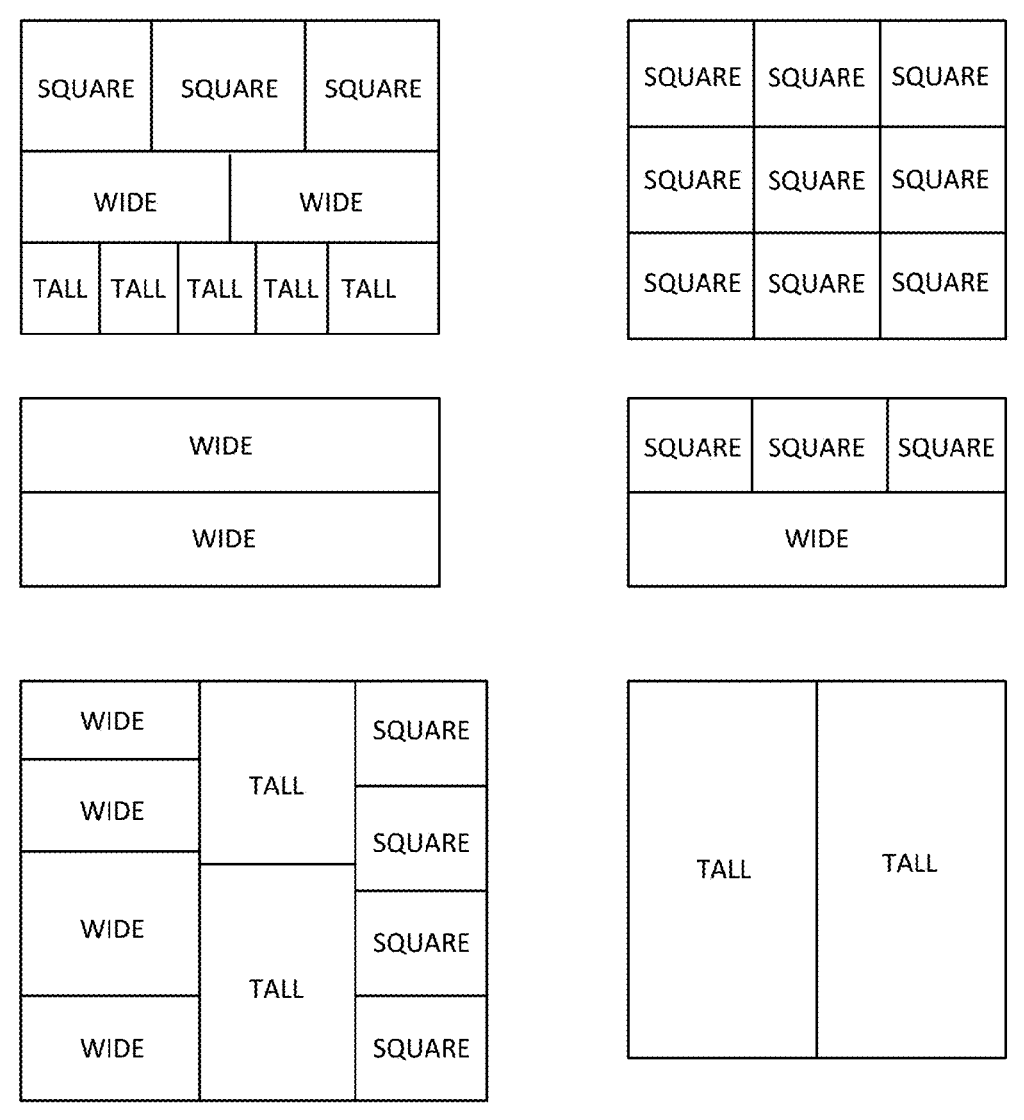

FIG. 9 shows examples of some annotated layouts that are possible given the constraints specified above, e.g., that there are one to three rows, two to five columns, one to five slots per row, or two to four slots per column. The annotations may be used, as described below, during the process for assigning image modules to layouts. For example, image modules whose width is greater than their height may be assigned to slots annotated as "wide", and so forth.

Process 700 selects (705) candidate templates corresponding to the annotated layouts. The candidate templates may be selected, and retrieved, from a library of predefined templates. The library may be, e.g., part of content management system 600 or elsewhere on network 602. The candidate templates that are selected include library templates having row/column formats that correspond so the possible layouts identified per Table 1, and annotated per Table 2.

In this regard, slots of the library templates may have sizes (e.g., heights or widths) that vary from template-to-template. So, for example, a slot size configured to accommodate a big image module may be 100 pixels in width in a first template, a slot size configured to accommodate a big image module may be 80 pixels in width in a second template, a slot size configured to accommodate a big image module may be 65 pixels in width in a third template, and so forth. In some implementations, slot sizes between templates need not be variable in this manner.

Figure 10:
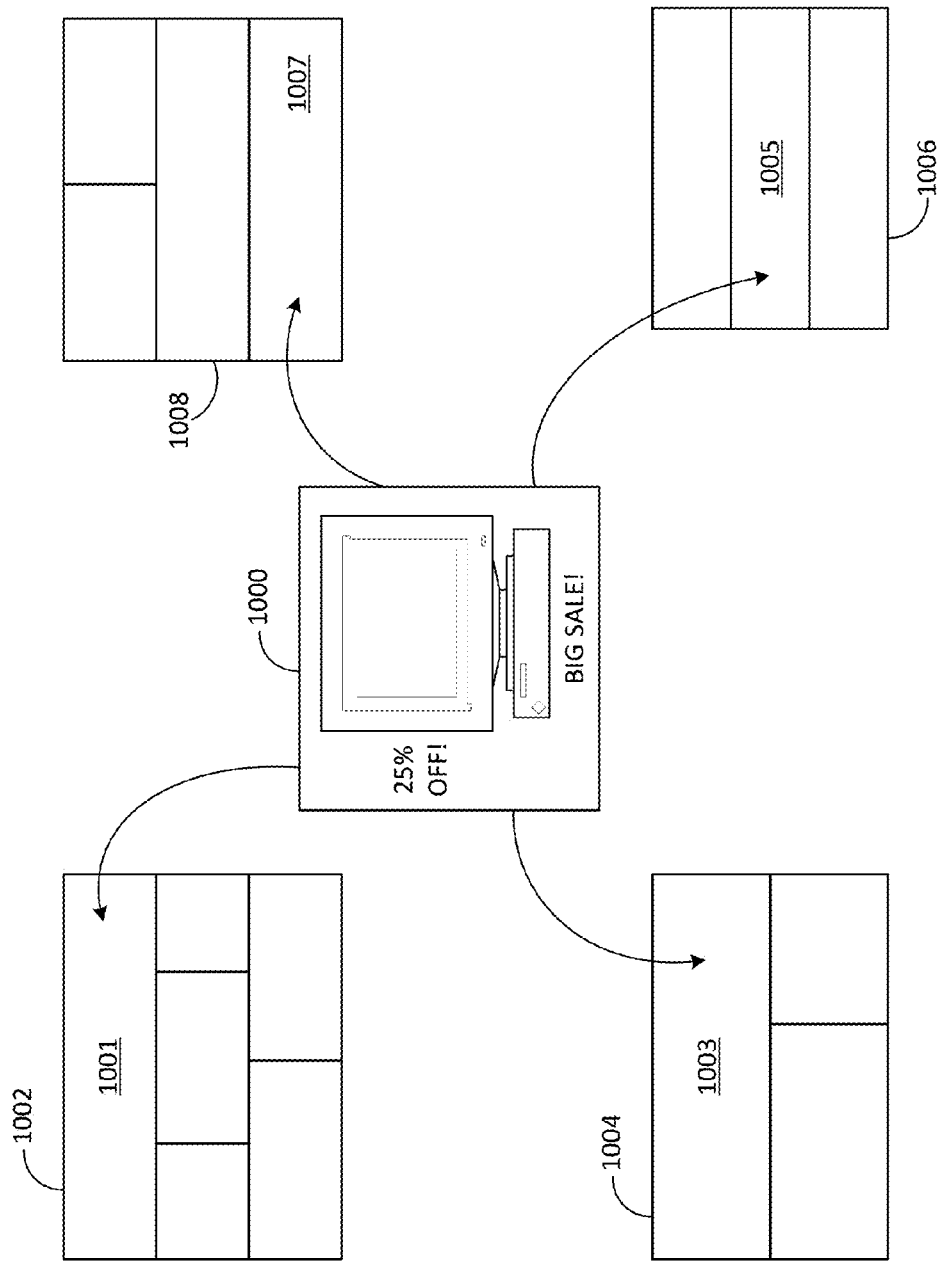
FIG. 10 shows an example template.

Process 700 performs operations to add (706) image modules to the candidate templates. In a case where there is more than one group of image modules, image modules from each group are added to a corresponding set of templates. Process 700 may arbitrarily assign big image modules, which were previously assigned (703) to the subject template(s), to slots of the candidate layouts. Process 700 may arbitrarily assign small image modules to remaining slots in the templates. Assignment of the big and small image modules to the slots may be based, at least in part, on the annotated slot aspect ratios. For example, image modules in which width exceeds height may be assigned to slots annotated as "wide"; image modules in which height exceeds width may be assigned to "tall" image modules; and so forth. The assignment process may be computer-implemented and, as such, appropriate image modules are assigned to appropriate slots for multiple possible permutations (e.g., every appropriate permutation of images modules and slots). For example, as shown in FIG. 10, image module 1000 may be assigned to slot 1001 in template 1002, to slot 1003 in template 1004, to slot 1005 in template 1006, to slot 1007 in template 1008, and so forth for other candidate templates (not shown). A template may be stored for each such assignment for later assessment.

Instead of, or in addition to, assigning image modules to slots by aspect ratio, process 700 may assign image modules to slots based on colors associated with the image modules. For example, image modules may be assigned so that image modules with white backgrounds are grouped together in the layouts and so that image modules with colored backgrounds are grouped together in the layouts. For example, image processing techniques (e.g., color image processing techniques) may be used to identify and/or match colors in image modules.

Other criteria may also be used to assign image modules to the templates. For example, the image modules may be ranked based on one or more criteria or metadata associated with the object being displayed in the module (as opposed to visual measurements of the module itself), and the rankings may dictate how image modules are assigned. For example, the most highly ranked image modules may be assigned to, e.g., the first page of an electronic circular or, e.g., to the top line of each template of each page, with successively lower ranked image modules assigned at successively lower positions in the templates and/or pages of the electronic circular.

A different example process for adding image modules to the candidate templates may include, e.g., identifying the biggest image module (e.g., the image module having the largest pixel area), and then locating the template with the smallest slot that accommodates that biggest image module. This process may be performed for each row and/or column in order to assign the image modules such that the image modules do not have sizes that exceed a predefined maximum. This can be expressed mathematically as follows.

F is a function that accepts a list of image modules and a number K of groups of image modules, where the groups may correspond to a number of rows or columns. F outputs a metric value for the template that best accommodates those image modules, given the K groups. G is a function that accepts a list of image modules and that returns the area of the largest image module among the image modules (after scaling to fit a row or column). In the following equation, o1 . . . on are the image modules.

F is defined as follows:

$$F(o_1, \ldots, o_n, K) = \min_{i=1,\ldots,n} (\max\{G(o_1, \ldots, o_i), F(o_{i+1}, \ldots, o_n, K-1)\})$$

$$F(o_1, \ldots, o_n, 0) = \infty$$

$$F(K) = \infty$$

$$F(0) = 0$$

In F, the max function returns area of the biggest image module that can be accommodated by a row or column of an identified template. The min function returns a value that minimizes the value of the max function. The template that can accommodate that biggest image module in the least amount of space is selected.

F is called for the image modules, and repeated until each of the image modules is assigned to a slot of a template. If there are image modules left to assign, but no remaining rows or columns to assign, the output of F is infinity. If there are no ("0") image modules to assign, the output of F is zero.

Figure 11:
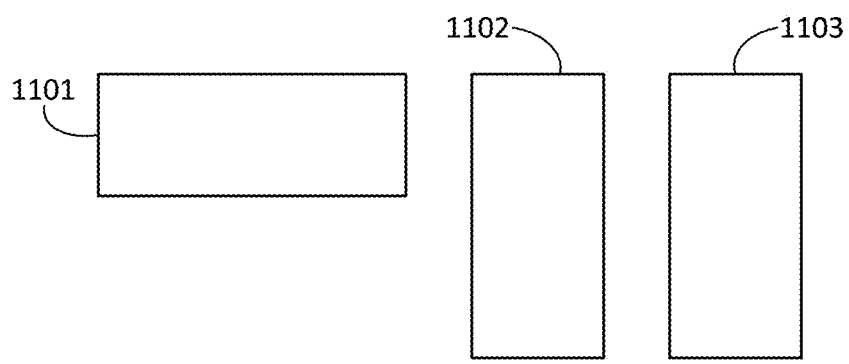
FIG. 11 shows examples of image modules to be assigned to a template.

FIG. 11 shows examples of image modules to be assigned to a template. In this example, the size of image module 1101 is 200×50 (in terms of pixels), the size of image module 1102 is 50×100, and the size of image module 1103 is 50×100. In this example, a layout is to be created having two rows, with a template width of 100. Accordingly, function F is called for the three image modules with a value of K=2. F will first attempt to place first image module 1101 in a first row alone. Since the first image module has a width of 200, and the maximum width is 100, the first image module will be scaled-down by half, e.g., so that it is 100×25. After this is done, F then calls itself for the following two image modules 1102, 1103 with K=1. F then places the remaining two image modules 1102, 1103 in the next (second) row (since the number of rows is limited to two). This results in the layout of FIG. 12.

Figure 12:
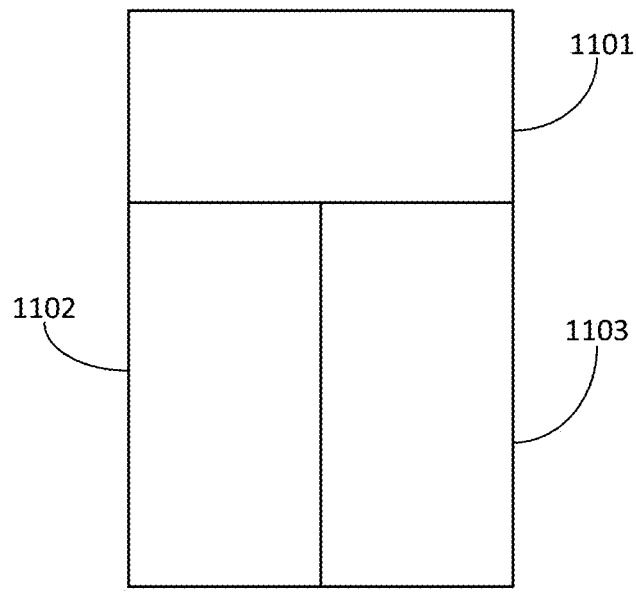
FIGS. 12 and 13 show example template layouts.

In the case of FIG. 12, scaled-down image module 1101 in the first row has an area of 2500 square pixels. Each image module in the second row has an area of 5000. So, $F(o_2, o_3, 1)$ outputs 5000 for the second row.

Figure 13:
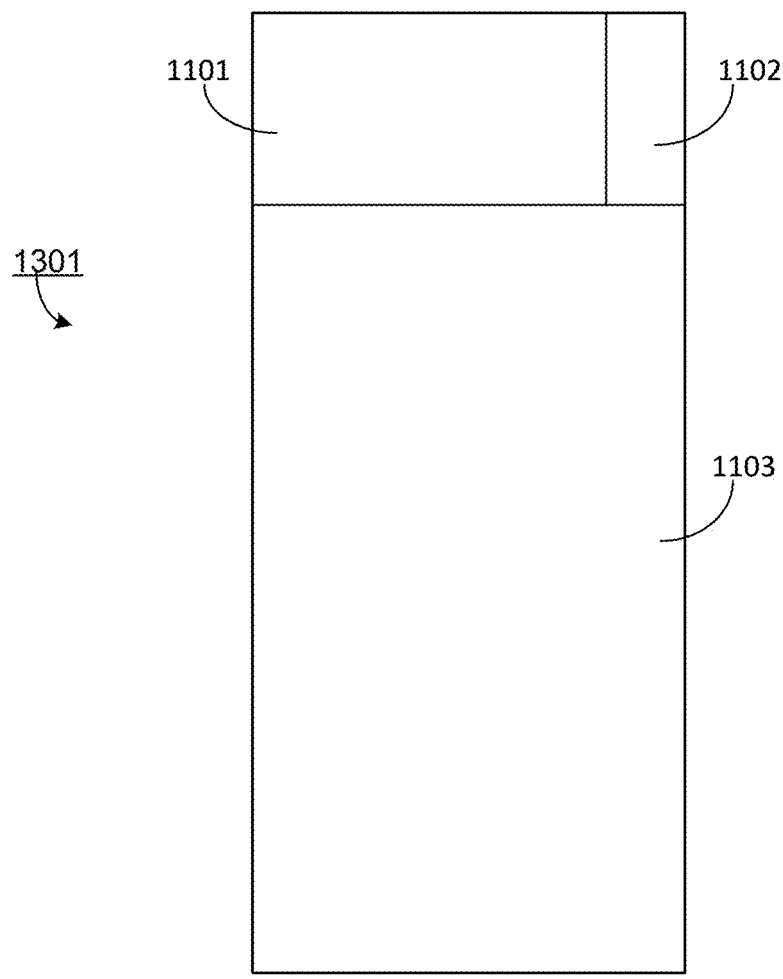

F next attempts to place two image modules (e.g., image modules 1101 and 1102) in a first row of a template. In this example, to fit in the first row, the first image module is scaled-down to make room for the second image module, which itself is scaled-down to match the height of the first image module. In this example, the first image module 1101 and second image module 1102 are scaled to (88, 22) and (11, 22), respectively. When F is called recursively, it is determined that the third image module is to be alone in a row. Accordingly, third image module 1103 is scaled-up by a factor of two (so that its width goes from 50 to 100). As a result, the area of third image module 1103 is now 20,000 square pixels (100×200). The result is the layout 1301 shown in FIG. 13.

So, in the second attempt, the largest image module 1103 has an area of 20,000 square pixels. In FIG. 12, the largest image module has an area of 5,000 square pixels. In this example, first layout of FIG. 12 is preferred, since the largest image module in FIG. 12 has a smaller area than the largest image module in FIG. 13. Accordingly, the image modules may be added (706) to the template using the layout of FIG. 12 rather than the layout of FIG. 13.

Figure 14:
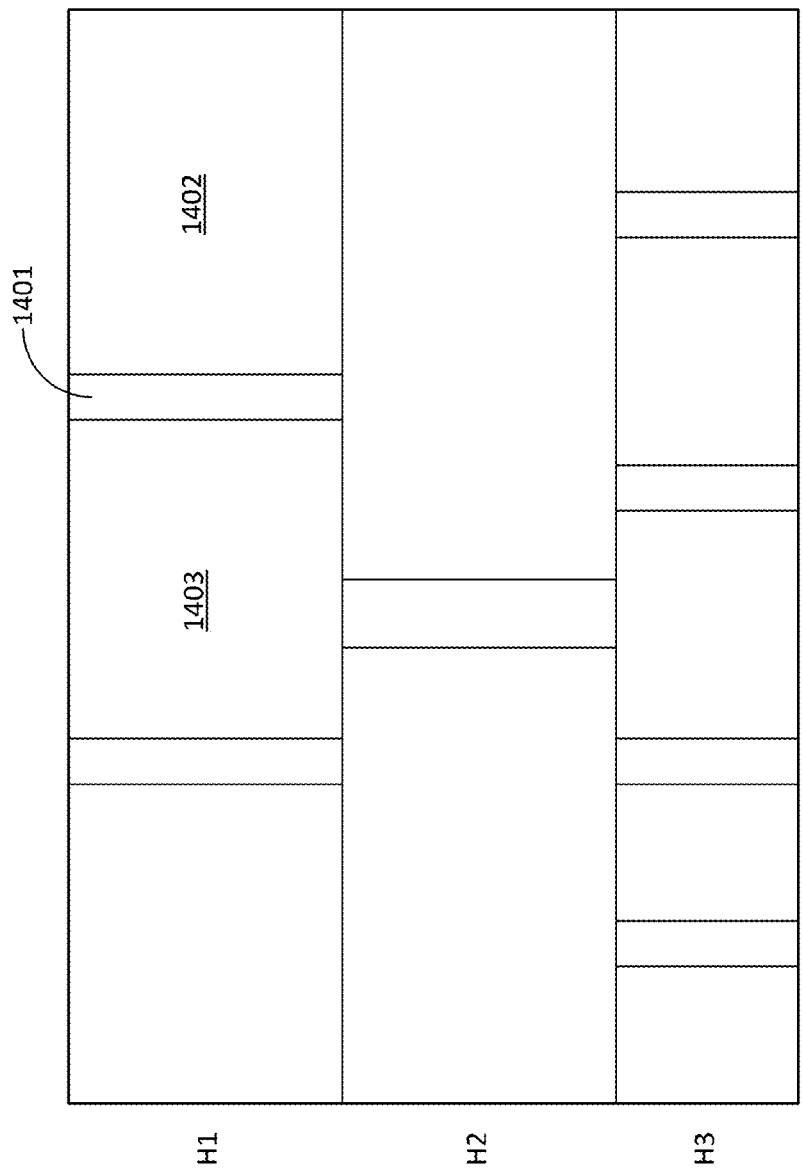
FIG. 14 shows an example of padding between image modules.

Referring back to FIG. 7, at this point, process 700 has generated candidate templates with appropriate image module assignments. Some of the image modules may not fit the slot bounds of each template. Accordingly, process 700 may scale (707) the image modules, e.g., as described above with respect to FIG. 13. Increases or decreases in size may include changes to image height and/or width. In some examples, the aspect ratio of an image module is preserved when the image module is scaled, although this need not be the case. Process 700 may also add padding between image modules. In this example, padding includes pixels adjacent to an image module, but that are not part of the image module. The padding may be added, e.g., to areas between the image modules and/or to areas between the image modules and template borders. FIG. 14 shows an example of padding 1401 between image modules 1402 and 1403.

In some implementations, padding is added and each row or column of a template is also scaled to meet the width of a viewport (e.g., a computer display showing the template). In other implementations, each template is scaled to match the width or height of the viewport (whichever is least), padding is added to each row or column, and the rows and columns are scaled iteratively until the amount of padding between image modules is the same across rows and columns.

Referring back to FIG. 7, process 700 determines (708) if there is more than one template per layout. If so, process 700 orders (709) the templates. As explained in the example above, a rank score may be assigned to each template. The rank score may be a sum of scores associated with image modules in a template. The scores may be predefined, e.g., by an advertiser, and stored in metadata associated with the corresponding image modules. Alternatively, scores may be assigned to big and small modules in the templates, e.g., with a higher score being assigned to big image modules than to small image modules. The templates may then be ranked by score. Alternatively, the templates may be displayed and ordered manually.

Process 700 outputs (710) data for use in displaying the templates, filled with image modules, on a computer display screen for selection. The templates may be evaluated, e.g., manually or using computer-aided evaluation tools, to identify which template (or group of templates) has a desired visual quality. Factors that may be considered by process 700 include, but are not limited to: the symmetry of image modules across rows/columns; whether internal grid lines of the templates line-up or are in the middle of an image module; whether images having colored backgrounds are adjacent to each other; whether big items are at the forefront of a template, the number of image modules per unit of space; the average number of pixels per image module; whether adjacent columns match; the percentage of image modules placed in their natural aspect ratio; the minimum width of the image modules; the average width of the image modules; and a number of items in the top and bottom rows or left and right columns. For factors that are quantifiable, computer-aided tools may be used to perform the analysis as to which of the candidate templates is to be selected. For non-quantifiable factors, selection may be made manually.

A template or templates may be selected, e.g., in response to a user input. The selected template or templates are then output as the electronic circular. The electronic circular may be output, e.g., in accordance with the mechanisms described above with respect to FIG. 6 or other appropriate mechanisms.

FIG. 8 is a flowchart showing an example process 800 for separating (703) image modules into groups for assignment to templates. Process 800 may be performed, e.g., by layout engine 610 in content management system 600 (FIG. 6).

Process 800 may be performed, e.g., to relate the density of images modules in the resulting electronic circular to the density of image modules, e.g., in a printed (e.g., non-electronic) circular that includes the image modules or in another document (electronic or otherwise) from which the image modules were taken. In other words, process 800 may separate the image modules so that the number of image modules per page in the electronic circular is close to, or about the same as, the number of image modules in the printed circular or other document.

To this end, process 800 determines (801) the number of images per page in the original document (e.g., printed circular). In this example, number of images per page is referred to as OPP (for "objects per page", where an "object" corresponds to an image module, such as an advertisement). If there was a single page in the original printed circular, then OPP will have a value that corresponds to the number of original images in the printed circular. On the other hand, if the original circular included more than one page, then OPP will correspond to an average number of images across the pages. So, for example, if five image modules were taken from a page having ten images, and five other image modules were taken from a page having twenty images, then OPP for those pages is fifteen (the average of ten and twenty).

Process 800 determines (802) a number of layouts per page of the original document. In this example, this variable is referred to as TPP (for "templates per page", which is approximately the number of online templates estimated to be required to hold the number of images shown on a single printed page). TPP may be a predefined variable for a publisher (e.g., a retailer) of an electronic circular, and may be retrieved, e.g., from memory or received along with the constraints, e.g., in process 700. In some examples, TPP is between 1 and 4, e.g., 1.5.

Process 800 determines (803) the number of images per layout. This variable is referred to as "OPT" (for "objects per template"). OPT is equal to the quotient of OPP and TPP, or OPP/TPP.

Process 800 determines (804) if the number of image modules is less than or equal to OPT plus a constant (in this example, OPT+2). If so, then there will be a single layout for the received objects, e.g., number of layouts=1 (805). If not, then the number of layouts is equal to a quotient of the number of image modules and OPT rounded-up to the nearest integer (806), or (#image modules)/OPT rounded-up. So, for example, if there are 20 image modules, and 10 images/layout, then the number of layouts is 2. If there are 20 image modules, and 8 images/layout, then the number of layouts is 3, since 20/8 rounded-up to the nearest integer is 3.

Figure 15:
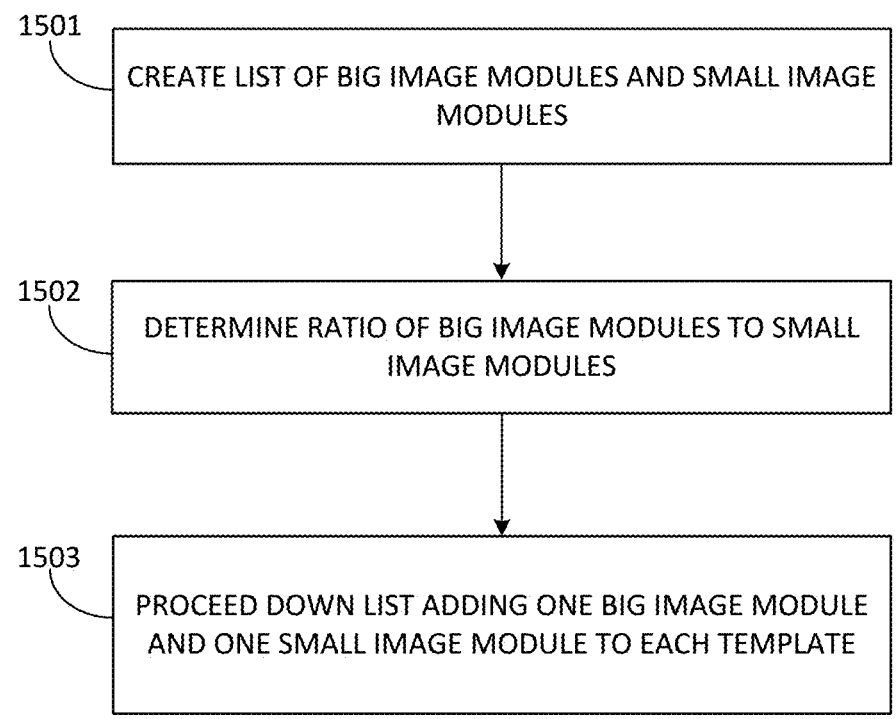
FIG. 15 is a flowchart showing an example process for assigning image modules to layouts.

After the number of layouts have been determined, in process 800, image modules may be assigned to those layouts, as described, e.g., with respect to FIG. 7. FIG. 15 is a flowchart showing an example process 1500 for assigning (703) image modules to layouts. Process 1500 may be performed, e.g., by layout engine 610 in content management system 600 (FIG. 6).

To begin, process 1500 obtains the number of layouts (N) from process 800, and the the number of big and small image modules from process 700. Process 1500 creates (1501) a list containing the big image modules and a list containing the small image modules. The image modules in each list may be ordered arbitrarily or, e.g., according to some metric, e.g., ranking (e.g., importance of advertising to the publisher or client), size, color, background color, product, or the like. Process 1500 determines (1502) a ratio of big image modules to small image modules 1:Y, where "Y" is the number of small image modules per big image module. Process 1500 proceeds (1503) down each list and adds, from each list, one big image module and one small image module to a first layout. This is done until the total number of image modules in a layout equals OPT. At that point, process 1500 is repeated for a next layout, and so forth, until both lists are exhausted.

Figure 16:
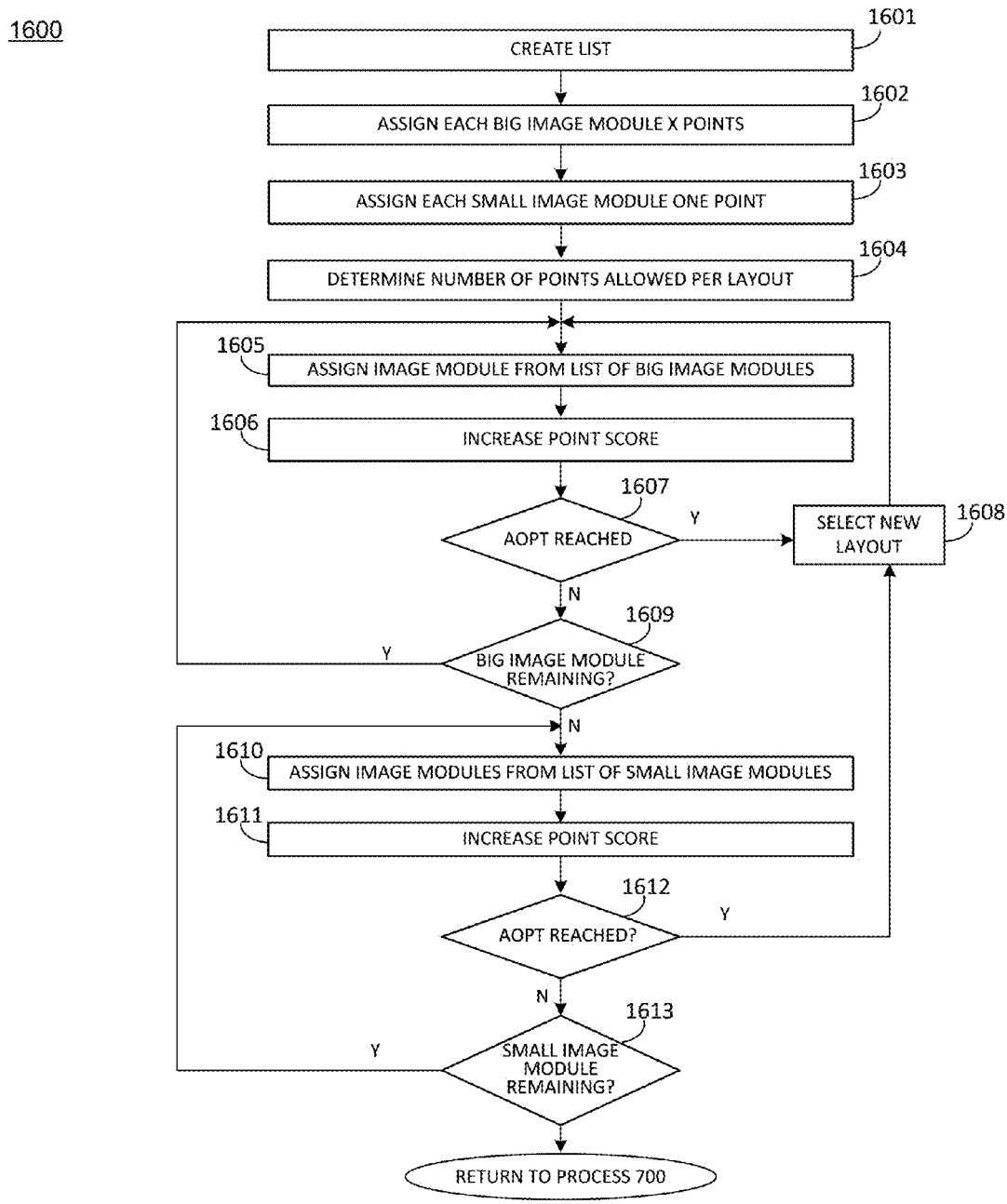
FIG. 16 is a flowchart showing an example process for assigning image modules to layouts.

FIG. 16 is a flowchart showing another example process 1600 for assigning image modules to layouts. Process 1600 may be performed, e.g., by layout engine 610 in content management system 600 (FIG. 6).

As above, process 1600 creates (1601) a list containing big image modules and a list containing small image modules. The image modules in each list may be ordered arbitrarily or, e.g., according to some metric, e.g., ranking, size, color, background color, product, or the like. In this example, process 1600 assigns (1602) each big image module a number "X" points. In this example X is between 2 and 4 (e.g., 3); however, other values of X may be assigned in other examples. X, in this example, represents a multiple of an area covered by a big image module relative to an area covered by a small image module (e.g., in the case of X=3, a big image module covers three times the area of a small image module). Accordingly, process 1600 assigns (1603) each small image module one point in this example.

Process 1600 determines (1604) the number of points permitted per layout. In this example, that variable, for a layout, is referred to as AOPT (for "adjusted objects per template"). AOPT is defined as follows:

$$AOPT=OPT*(X*B+S)/\#imagemodules,$$

where OPT is defined above, X is the number of points assigned to big image modules, B is the number of big image modules, S is the number of small image modules, and #imagemodules is the total number of image modules.

Process 1600 assigns an (1605) image module from the list of big image modules to a layout, and increases (1606) the point score assigned to the layout by X. Process 1600 checks to determine (1607) if the point score is at or above AOPT. If so, a new layout is selected (1608) to populate with image modules. If not, and if there are more big image modules remaining from the list to be assigned (1605), process assigns (1605) another big image module from the list to the template, and proceeds accordingly until there are no big modules remaining to be assigned (1609).

Thereafter, process 1600 assigns (1610) image modules from the list of small image modules to the current layout, and increases (1611) the point score assigned to the layout by one (since a small image module is assigned). Process 1600 checks (1612) to determine if the point score is at or above AOPT. If so, a new layout is selected (1608) to populate. If not, and if there are more small image modules remaining from the list to be assigned (1613), process assigns (1610) another small image module to the template, and proceeds accordingly until there are no small modules remaining to be assigned (1613).

Other factors may be taken into account by process 1600 when assigning image modules to layouts. For example, computer-aided tools may be used to group together image modules having a same type (e.g., white background, colored background, or the like), to attempt to allocate each big image modules to a first layout and small image modules to other layout(s), to limit the number of big items to four items per layout, to group together image modules having similar aspect ratios, to group together image modules related to similar or related products (e.g., brands of digital music players, or digital music players and headphones), or to promote grid alignment (e.g., to have a grid in a second row of a template hit a first row close to the middle of an image module, or to have grids in the rows match-up).

Figure 17:
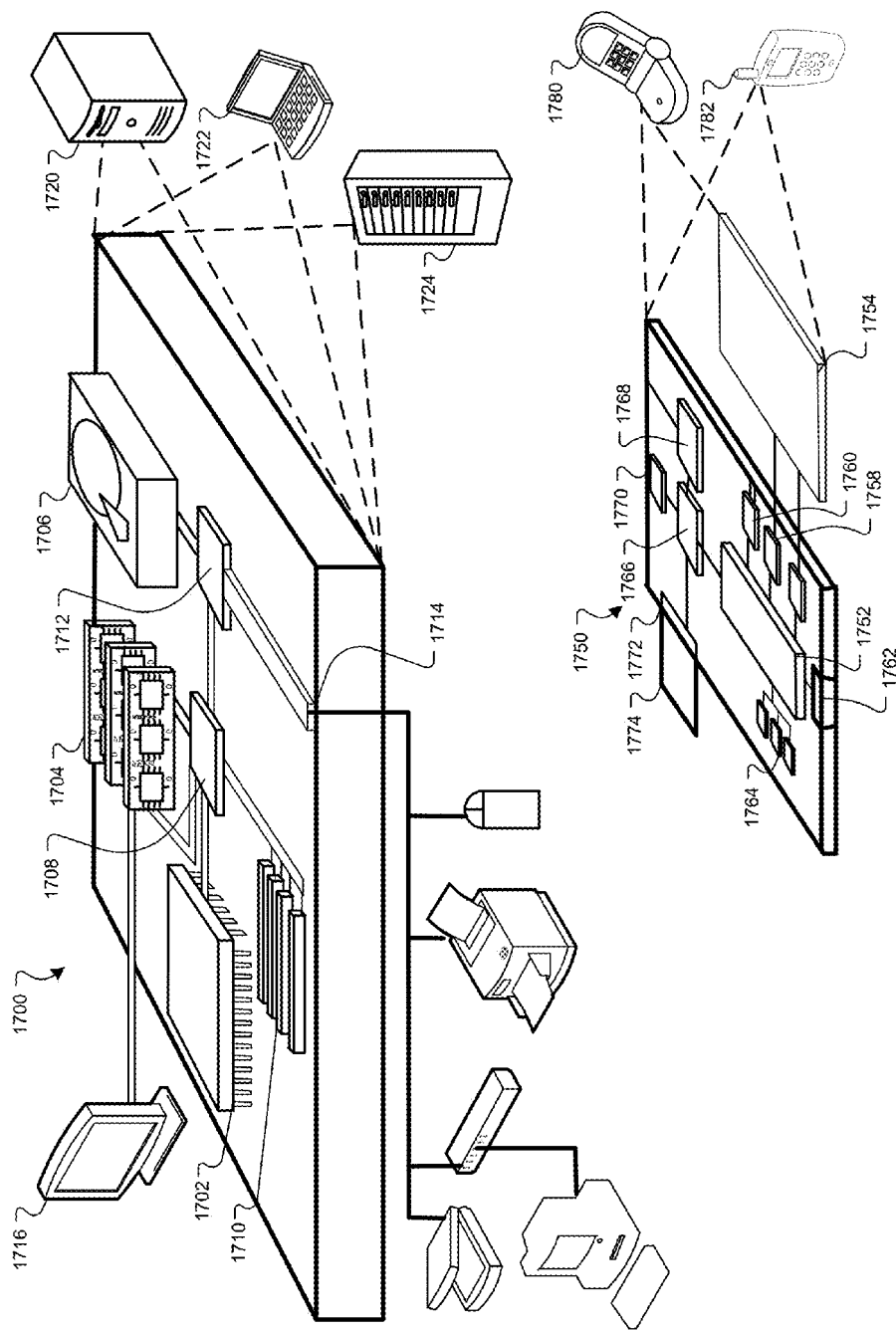
FIG. 17 shows examples of computing devices on which the processes described herein, or portions thereof, may be implemented.

FIG. 17 shows an example of a generic computing device 1700 and a generic mobile computing device 1750, which may be used to implement the processes described herein, or portions thereof. For example, content management system 210 and search system 212 may be implemented by computing device 1700 and mobile computing device 1750 may implement a user device 206 of FIG. 2. Computing device 1700 is intended to represent various forms of digital computers, e.g., laptops, desktops, workstations, personal digital assistants, servers, blade servers, mainframes, and other appropriate computers. Computing device 1750 is intended to represent various forms of mobile devices, e.g., personal digital assistants, cellular telephones, smartphones, and other similar computing devices. The components shown here, their connections and relationships, and their functions, are meant to be exemplary only, and are not meant to limit the scope of the appended claims.

Computing device 1700 is intended to represent various forms of digital computers, examples of which include laptops, desktops, workstations, personal digital assistants, servers, blade servers, mainframes, and other appropriate computers. Computing device 1750 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 1700 includes a processor 1702, memory 1704, a storage device 1706, a high-speed interface 1708 connecting to memory 1704 and high-speed expansion ports 1710, and a low speed interface 1712 connecting to low speed bus 1714 and storage device 1706. Each of the components 1702, 1704, 1706, 1708, 1710, and 1712, are interconnected using various busses, and may be mounted on a common motherboard or in other manners as appropriate. The processor 1702 can process instructions for execution within the computing device 1700, including instructions stored in the memory 1704 or on the storage device 1706 to display graphical information for a GUI on an external input/output device, for example, display 1716 coupled to high speed interface 1708. In other implementations, multiple processors and/or multiple buses may be used, as appropriate, along with multiple memories and types of memory. Also, multiple computing devices 1700 may be connected, with each device providing portions of the necessary operations (e.g., as a server bank, a group of blade servers, or a multi-processor system).

The memory 1704 stores information within the computing device 1700. In one implementation, the memory 1704 is a volatile memory unit or units. In another implementation, the memory 1704 is a non-volatile memory unit or units. The memory 1704 may also be another form of computer-readable medium, examples of which include a magnetic or optical disk.

The storage device 1706 is capable of providing mass storage for the computing device 1700. In one implementation, the storage device 1706 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 1704, the storage device 1706, memory on processor 1702, or a propagated signal. For example, the information carrier may be a non-transitory, machine-readable storage medium.

The high speed controller 1708 manages bandwidth-intensive operations for the computing device 1700, while the low speed controller 1712 manages lower bandwidth-intensive operations. Such allocation of functions is exemplary only. In one implementation, the high-speed controller 1708 is coupled to memory 1704, display 1716 (e.g., through a graphics processor or accelerator), and to high-speed expansion ports 1710, which may accept various expansion cards (not shown). In the implementation, low-speed controller 1712 is coupled to storage device 1706 and low-speed expansion port 1714. The low-speed expansion port, which may include various communication ports (e.g., USB, Bluetooth, Ethernet, wireless Ethernet) may be coupled to one or more input/ output devices, e.g., a keyboard, a pointing device, a scanner, or a networking device, e.g., a switch or router, e.g., through a network adapter.

The computing device 1700 may be implemented in a number of different forms, as shown in the figure. For example, it may be implemented as a standard server 1720, or multiple times in a group of such servers. It may also be implemented as part of a rack server system 1724. In addition, it may be implemented in a personal computer, e.g., a laptop computer 1722. Alternatively, components from computing device 1700 may be combined with other components in a mobile device (not shown), e.g., device 1750. Each of such devices may contain one or more of computing device 1700, 1750, and an entire system may be made up of multiple computing devices 1700, 1750 communicating with each other.

Computing device 1750 includes a processor 1752, memory 1764, an input/output device, e.g. a display 1754, a communication interface 1766, and a transceiver 1768, among other components. The device 1750 may also be provided with a storage device, e.g., a microdrive or other device, to provide additional storage. Each of the components 1750, 1752, 1764, 1754, 1766, and 1768, are interconnected using various buses, and several of the components may be mounted on a common motherboard or in other manners as appropriate.

The processor 1752 can execute instructions within the computing device 1750, including instructions stored in the memory 1764. The processor may be implemented as a chipset of chips that include separate and multiple analog and digital processors. The processor may provide, for example, for coordination of the other components of the device 1750, e.g., control of user interfaces, applications run by device 1750, and wireless communication by device 1750.

Processor 1752 may communicate with a user through control interface 1758 and display interface 1756 coupled to a display 1754. The display 1754 may be, for example, a TFT LCD (Thin-Film-Transistor Liquid Crystal Display) or an OLED (Organic Light Emitting Diode) display, or other appropriate display technology. The display interface 1756 may comprise appropriate circuitry for driving the display 1754 to present graphical and other information to a user. The control interface 1758 may receive commands from a user and convert them for submission to the processor 1752. In addition, an external interface 1762 may be provide in communication with processor 1752, so as to enable near area communication of device 1750 with other devices. External interface 1762 may provide, for example, for wired communication in some implementations, or for wireless communication in other implementations, and multiple interfaces may also be used.

The memory 1764 stores information within the computing device 1750. The memory 1764 can be implemented as one or more of a computer-readable medium or media, a volatile memory unit or units, or a non-volatile memory unit or units. Expansion memory 1774 may also be provided and connected to device 1750 through expansion interface 1772, which may include, for example, a SIMM (Single In Line Memory Module) card interface. Such expansion memory 1774 may provide extra storage space for device 1750, or may also store applications or other information for device 1750. Specifically, expansion memory 1774 may include instructions to carry out or supplement the processes described above, and may include secure information also. Thus, for example, expansion memory 1774 may be provide as a security module for device 1750, and may be programmed with instructions that permit secure use of device 1750. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 1764, expansion memory 1774, memory on processor 1752, or a propagated signal that may be received, for example, over transceiver 1768 or external interface 1762.

Device 1750 may communicate wirelessly through communication interface 1766, which may include digital signal processing circuitry where necessary. Communication interface 1766 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 1768. In addition, short-range communication may occur, e.g., using a Bluetooth, Wi-Fi, or other such transceiver (not shown). In addition, GPS (Global Positioning System) receiver module 1770 may provide additional navigation- and location-related wireless data to device 1750, which may be used as appropriate by applications running on device 1750.

Device 1750 may also communicate audibly using audio codec 1760, which may receive spoken information from a user and convert it to usable digital information. Audio codec 1760 may likewise generate audible sound for a user, e.g., through a speaker, e.g., in a handset of device 1750. Such sound may include sound from voice telephone calls, may include recorded sound (e.g., voice messages, music files, etc.) and may also include sound generated by applications operating on device 1750.

The computing device 1750 may be implemented in a number of different forms, as shown in the figure. For example, it may be implemented as a cellular telephone 1780. It may also be implemented as part of a smartphone 1782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server. The processes described herein and variations thereof contain functionality to ensure that party privacy is protected. To this end, the processes may be programmed to confirm that information about a party is publicly known before divulging that information to another party, or even before incorporating that information into a social graph.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

Other implementations not specifically described herein are also within the scope of the following claims.

What is claimed is:

1. A method comprising:
   receiving data corresponding to image modules;
   determining that the image modules will fit a layout;
   assigning image modules to the layout, wherein assigning comprises:
      assigning points to the image modules based on sizes of the image modules, where the image modules comprise first image modules and second image modules, the first image modules being larger than the second image modules, each first image module being assigned more points than a second image module;
      assigning, to the layout, image modules from the first image modules;
      determining a score based on a number of points for the layout, the number of points for the layout being based on a sum of points assigned to the first image modules assigned to the layout; and
      assigning either first image modules to the layout or second image modules to the layout based on whether the score exceeds a threshold;
   determining a number of possible permutations of the image modules given one or more constraints associated with images in the image modules;
   selecting a number of candidate templates to accommodate the layout, the number of candidate templates being based on the number of permutations;
   filling candidate templates with image modules;
   receiving an input selecting one of the candidate templates containing image modules; and
   outputting data for the selected candidate template, the data for generating a display of the selected candidate template.

2. The method of claim 1, wherein each of the image modules comprises an image, and one or more of the image modules comprises at least one of an information bar and padding, the information bar for displaying information relating a corresponding image, the padding comprising pixels adjacent to a corresponding image and apart from the corresponding image.

3. The method of claim 1, wherein, each of the candidate templates comprises slots to accommodate image modules; and
   wherein filling the candidate templates comprises placing image modules in slots of the candidate templates.

4. The method of claim 3, further comprising:
   associating annotations with the layout that assign image module attributes to structural features of the candidate templates;
   wherein the candidate templates are filled based on the annotations.

5. The method of claim 4, wherein the image module attributes comprise shapes of the image modules, and wherein the structural features of the candidate templates comprise a number of columns or rows in a template.

6. The method of claim 1, wherein the one or more constraints correspond to sizes of the image modules; and
wherein the number of possible permutations is determined based on an overall number of the image modules and a number of the first image modules.

7. The method of claim 1, wherein determining that the image modules will fit a layout comprises:
determining a number of image modules that can be included in a layout; and
selecting the image modules from among a set of received image modules, the selected image modules being a number of image modules that can be included in the layout.

8. The method of claim 1, wherein filling candidate templates with image modules comprises identifying a largest image module among the image modules, and identifying a template having a smallest slot that can accommodate the largest image module.

9. One or more non-transitory machine-readable media storing instructions that are executable to perform operations comprising:
receiving data corresponding to image modules;
determining that the image modules will fit a layout;
assigning image modules to the layout, wherein assigning comprises:
assigning points to the image modules based on sizes of the image modules, where the image modules comprise first image modules and second image modules, the first image modules being larger than the second image modules, each first image module being assigned more points than a second image module;
assigning, to the layout, image modules from the first image modules;
determining a score based on a number of points for the layout, the number of points for the layout being based on a sum of points assigned to the first image modules assigned to the layout; and
assigning either first image modules to the layout or second image modules to the layout based on whether the score exceeds a threshold;
determining a number of possible permutations of the image modules given one or more constraints associated with images in the image modules;
selecting a number of candidate templates to accommodate the layout, the number of candidate templates being based on the number of permutations;
filling candidate templates with image module;
receiving an input selecting one of the candidate templates containing image modules; and
outputting data for the selected candidate template, the data for generating a display of the selected candidate template.

10. The one or more non-transitory machine-readable media of claim 9, wherein each of the image modules comprises an image, and one or more of the image modules comprises at least one of an information bar and padding, the information bar for displaying information relating a corresponding image, the padding comprising pixels adjacent to a corresponding image and apart from the corresponding image.

11. The one or more non-transitory machine-readable media of claim 9, wherein, each of the candidate templates comprises slots to accommodate image modules; and
wherein filling the candidate templates comprises placing image modules in slots of the candidate templates.

12. The one or more non-transitory machine-readable media of claim 11, wherein the operations further comprise:
associating annotations with the layout that assign image module attributes to structural features of the candidate templates;
wherein the candidate templates are filled based on the annotations.

13. The one or more non-transitory machine-readable media of claim 12, wherein the image module attributes comprise shapes of the image modules, and wherein the structural features of the candidate templates comprise a number of columns or rows in a template.

14. The one or more non-transitory machine-readable media of claim 9, wherein the one or more constraints correspond to sizes of the image modules; and
wherein the number of possible permutations is determined based on an overall number of the image modules and a number of the first image modules.

15. The one or more non-transitory machine-readable media of claim 9, wherein determining that a set of the image modules will fit a layout comprises:
determining a number of image modules that can be included in a layout; and
selecting the image modules from among a set of received image modules, the selected image modules being a number of image modules that can be included in the layout.

16. The one or more non-transitory machine-readable media of claim 9, wherein filling candidate templates with image modules comprises identifying a largest image module among the image modules, and identifying a template having a smallest slot that can accommodate the largest image module.

17. A system comprising a processor in electrical communication with a non-transitory memory element storing instructions that, when executed, cause the processor to execute the steps comprising:
receiving data corresponding to image modules;
determining that the image modules will fit a layout;
assigning image modules to the layout, wherein assigning comprises:
assigning points to the image modules based on sizes of the image modules, where the image modules comprise first image modules and second image modules, the first image modules being larger than the second image modules, each first image module being assigned more points than a second image module;
assigning, to the layout, image modules from the first image modules;
determining a score based on a number of points for the layout, the number of points for the layout being based on a sum of points assigned to the first image modules assigned to the layout; and
assigning either first image modules to the layout or second image modules to the layout based on whether the score exceeds a threshold;
determining a number of possible permutations of the image modules given one or more constraints associated with images in the image modules;
selecting a number of candidate templates to accommodate the layout, the number of candidate templates being based on the number of permutations;
filling candidate templates with image modules from the set;
receiving an input selecting one of the candidate templates containing image modules; and outputting data for the selected candidate template, the data for generating a display of the selected candidate template.

18. The system of claim 17, wherein each of the image modules comprises an image, and one or more of the image modules comprises at least one of an information bar and padding, the information bar for displaying information relating a corresponding image, the padding comprising pixels adjacent to a corresponding image and apart from the corresponding image.

19. The system of claim 17, wherein, each of the candidate templates comprises slots to accommodate image modules; and wherein filling the candidate templates comprises placing image modules in slots of the candidate templates.

20. The system of claim 19, wherein the layout engine is operable to perform operations comprising:

associating annotations with the layout that assign image module attributes to structural features of the candidate templates;

wherein the candidate templates are filled based on the annotations.

21. The system of claim 20, wherein the image module attributes comprise shapes of the image modules, and wherein the structural features of the candidate templates comprise a number of columns or rows in a template.

22. The system of claim 17, wherein the one or more constraints correspond to sizes of the image modules; and wherein the number of possible permutations is determined based on an overall number of the image modules and a number of the first image modules.

23. The system of claim 17, wherein determining that a set of the image modules will fit a layout comprises:

determining a number of image modules that can be included in a layout; and selecting the image modules from among a set of received image modules, the selected image modules being a number of image modules that can be included in the layout.

24. The system of claim 17, wherein filling candidate templates with image modules comprises identifying a largest image module among the image modules, and identifying a template having a smallest slot that can accommodate the largest image module.

* * * * *